(12) United States Patent
Tulino et al.

(10) Patent No.: US 8,681,902 B2
(45) Date of Patent: Mar. 25, 2014

(54) METHOD AND APPARATUS FOR LOW COMPLEXITY ROBUST RECONSTRUCTION OF NOISY SIGNALS

(75) Inventors: Antonia Maria Tulino, Lincroft, NJ (US); Jose Ignacio Esnaola, Summit, NJ (US)

(73) Assignee: Alcatel Lucent, Paris (FR)

( * ) Notice: Subject to any disclaimer, the term of this patent is extended or adjusted under 35 U.S.C. 154(b) by 241 days.

(21) Appl. No.: 13/234,775

(22) Filed: Sep. 16, 2011

(65) Prior Publication Data
US 2013/0070831 A1 Mar. 21, 2013

(51) Int. Cl.
*H04L 27/06* (2006.01)
(52) U.S. Cl.
USPC ........................................................ 375/340
(58) Field of Classification Search
USPC .................................................. 375/240, 340
See application file for complete search history.

(56) References Cited

U.S. PATENT DOCUMENTS

| 5,218,534 A * | 6/1993 | Trousset et al. ............... 382/132 |
| 2006/0029279 A1 | 2/2006 | Donoho |
| 2009/0141995 A1 * | 6/2009 | Chakraborty et al. ........ 382/248 |
| 2011/0221718 A1 * | 9/2011 | Tan et al. ....................... 345/204 |
| 2012/0314822 A1 * | 12/2012 | Gupta ............................ 375/346 |

FOREIGN PATENT DOCUMENTS

| WO | WO-2007050680 A2 | 5/2007 |
| WO | WO-2008057980 A2 | 5/2008 |

OTHER PUBLICATIONS

Haupt J. et al.: "Signal reconstruction from noisy random projections", IEEE Transactions on Information Theory, IEEE Press, USA, vol. 52, No. 9, Sep. 1, 2006, pp. 4036-4048. (XP002600940).
Interrnational Search Report for related International Application No. PCT/US2012/053631.

* cited by examiner

*Primary Examiner* — Don N Vo
(74) *Attorney, Agent, or Firm* — Harness, Dickey & Pierce

(57) ABSTRACT

Embodiments relate to a method and apparatus for low complexity robust reconstruction of noisy signals. The method includes receiving, by a receiving unit, a set of noisy measurements. The method further includes obtaining, by a reconstruction unit, an estimate of the signal based on the set of noisy measurements and a plurality of parameters. The plurality of parameters includes a projection matrix that transforms the signal from a sparse domain to a compressed domain and postulated parameters.

20 Claims, 2 Drawing Sheets

METHOD AND APPARATUS FOR LOW COMPLEXITY ROBUST RECONSTRUCTION OF NOISY SIGNALS

BACKGROUND

Signal acquisition is a fundamental task of most conventional digital systems. Due to the time varying nature of most practical signals, a great deal of adaptive and/or robust techniques as well as fine tuning are required to achieve close to optimal reconstruction performances. Due to the time-varying nature of the signals' statistics, most signals cannot be modeled in the most general setting either as a stationary or Gaussian process.

This implies that optimal (e.g., in the minimum mean square error (MMSE) sense) signal reconstruction needs to resort to non-linear estimation (e.g., a conditional mean estimator), which requires a complete statistical characterization of the random process. However, this is both computationally complex and unfeasible due to the impossibility of an accurate description of higher order moments of the underlying random process. A conventional linear MMSE approach can still be implemented, but the performance degrades fast when the divergence between the true distribution and the Gaussian increases.

There are practical situations where, for signals with low time-variability of their statistics (e.g., block time-variability), the estimation can be carried under the assumption that the observed process is Gaussian. Reducing the problem to estimating a multivariate Gaussian observation has the advantage of low complexity since it can be solved with a linear MMSE estimator and limited knowledge of the channel statistics. For example, only a second order characterization of the signal is required. The performance of such an estimator however is relatively far from the optimum achievable performance if the time-variability of the statistics is not low enough. For several real scenarios which arise in communication systems, assuming low time-variability is not realistic and as a result the performance of linear MMSE estimation degrades as previously mentioned.

Another complication that arises in practical system is that even for the ideal case of block-time variability of the signals' statistics for which linear MMSE estimation performs optimally over each block, it still requires perfect knowledge or estimation of the second order moments of the signal, which can be quite challenging to obtain if the time-variations of the second-order statics of the signal are not slow enough. Therefore, in the case of having imperfect knowledge of the signals' statistics, the performance of the MMSE estimator may be degraded.

One conventional approach uses compressed sensing (CS) recovery algorithms, which exploit the underlying sparsity of signals. For example, most signals of practical interest admit a sparse representation in a given basis. Furthermore, sparsity levels can be expected to be almost stationary and not significantly affected by statistical changes of the underlying random process. However, the CS recovery algorithms may be sensitive to noise, which distorts the signals.

SUMMARY

Embodiments relate to a method and apparatus for low complexity robust reconstruction of noisy signals.

The method includes receiving, by a receiving unit, a set of noisy measurements. The method further includes obtaining, by a reconstruction unit, an estimate of the signal based on the set of noisy measurements and a plurality of parameters. The plurality of parameters includes a projection matrix that transforms the signal from a sparse domain to a compressed domain and postulated parameters.

The postulated parameters may include a postulated signal-to-noise ratio, postulated spasity and postulated covariance matrix of the signal in the sparse domain. Besides the receiving step, each method step may be performed by the reconstruction unit having at least one processor.

The method may further include first computing auxiliary covariance matrices based on the set of noisy measurements and at least one of the postulated parameters, identifying a new element of support of the signal in the sparse domain based on the projection matrix, the set of noisy measurements and at least one of the postulated parameters. The obtaining step obtains the estimate of the signal by solving an optimization problem (e.g., a minimum mean square error problem) using the identified new element of the support of the signal, the projection matrix and the computed auxiliary covariance matrices.

The method may further include second computing a residual signal based on the estimated signal and the set of noisy measurements, comparing the residual signal to a threshold, and repeating the first computing step, the identifying step, the obtaining step, the second computing step, and the comparing step, if the residual signal is above the threshold, otherwise the estimate is outputted as the reconstructed signal.

The second computing step may include evaluating a difference between the set of noisy measurements and the estimated signal projected in the compressed domain.

In one embodiment, the first computing step computes the auxiliary covariance matrices based on the set of noisy measurements, the postulated covariance matrix of the signal and the postulated signal-to-noise ratio. The identifying step identifies the new element of the signal based on the projection matrix, the set of noisy measurements, and the postulated covariance matrix of the signal.

In one embodiment, the estimate of the signal may be an estimate of a channel response in a wireless communication network. The signal has been encoded or acquired based on compressive sensing.

The apparatus includes a receiving unit configured to receive the set of noisy measurements. Also, the apparatus includes a reconstruction unit configured to obtain an estimate of the signal based on the set of noisy measurements and a plurality of parameters. The plurality of parameters includes a projection matrix that transforms the signal from a sparse domain to a compressed domain and postulated parameters.

The postulated parameters may include a postulated signal-to-noise ratio, postulated spasity and postulated covariance matrix of the signal in the sparse domain.

The reconstruction unit is configured to first compute auxiliary covariance matrices based on the set of noisy measurements and at least one of the postulated parameters. The reconstruction unit is configured to identify a new element of support of the signal in the sparse domain based on the projection matrix, the set of noisy measurements and at least one of the postulated parameters. The reconstruction unit is configured to obtain the estimate of the signal by solving an optimization problem (e.g., e.g., a minimum mean square error problem) using the identified new element of the support of the signal, the projection matrix and the computed auxiliary covariance matrices.

The reconstruction unit is configured to second compute a residual signal based on the estimated signal projected in the compressed domain and the set of noisy measurements. The reconstruction unit is configured to compare the residual signal to a threshold. The reconstruction unit is configured to repeat the first computing, the identifying, the obtaining, the second computing, and the comparing, if the residual signal is above the threshold, otherwise the reconstruction unit outputs the estimate as the reconstructed signal.

The reconstruction unit is configured to compute the residual signal by evaluating a difference between the set of noisy measurements and the estimated signal projected in the compressed domain.

The reconstruction unit computes the auxiliary covariance matrices based on the set of noisy measurements, the postulated covariance matrix of the signal and the postulated signal-to-noise ratio.

The reconstruction unit identifies the new element of the signal based on the projection matrix, the set of noisy measurements, and the postulated covariance matrix of the signal.

In one embodiment, the estimate of the signal may be an estimate of a channel response in a wireless communication network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
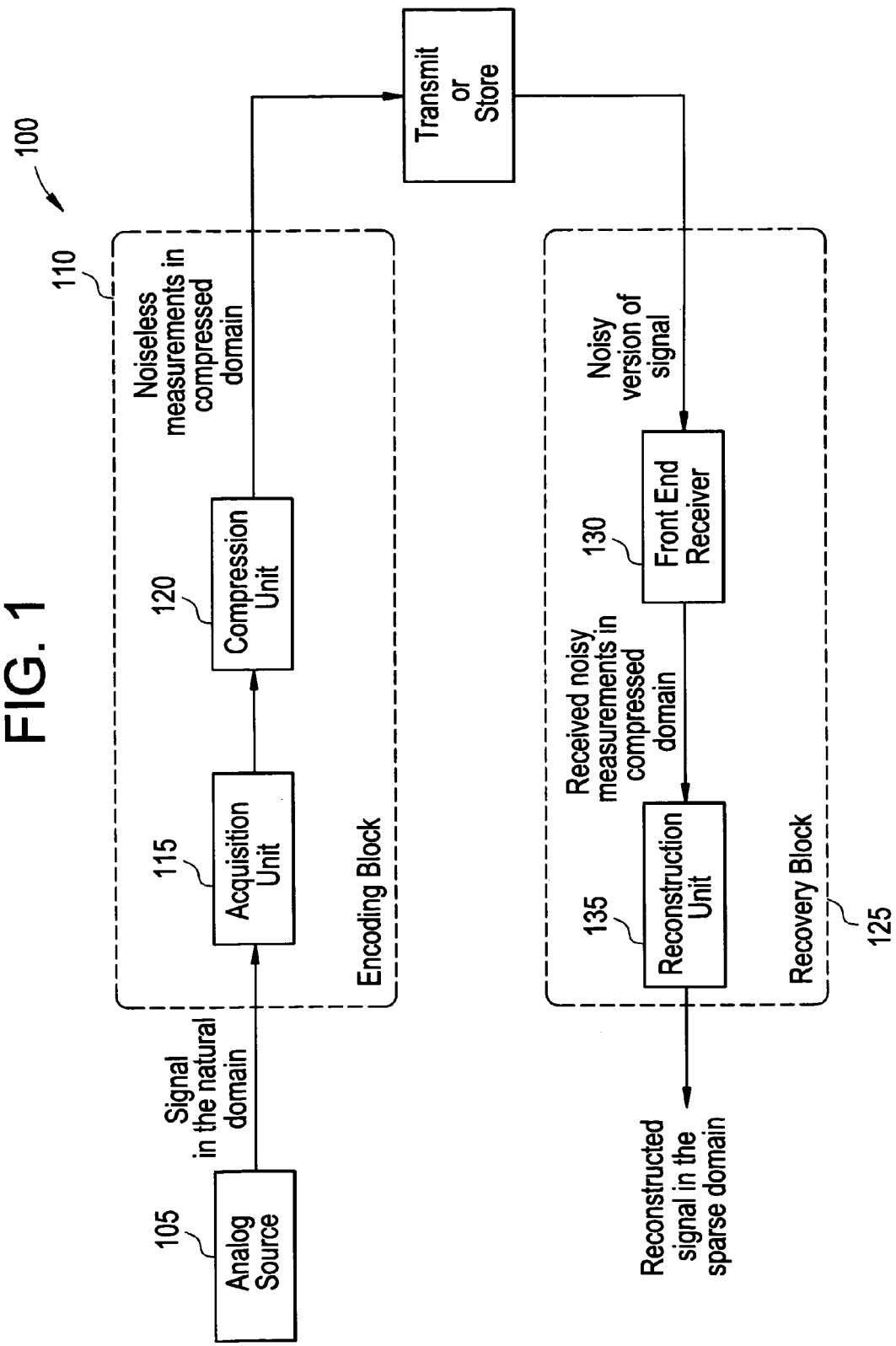
FIG. 1 illustrates a system for reconstruction of noisy signals in the sparse domain according to an embodiment.

Various embodiments of the present disclosure will now be described more fully with reference to the accompanying drawings. Like elements on the drawings are labeled by like reference numerals.

As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The embodiments will now be described with reference to the attached figures. Various structures, systems and devices are schematically depicted in the drawings for purposes of explanation only and so as not to obscure the present disclosure with details that are well known to those skilled in the art. Nevertheless, the attached drawings are included to describe and explain illustrative examples of the embodiments. The words and phrases used herein should be understood and interpreted to have a meaning consistent with the understanding of those words and phrases by those skilled in the relevant art. To the extent that a term or phrase is intended to have a special meaning, i.e., a meaning other than that understood by skilled artisans, such a special definition will be expressly set forth in the specification that directly and unequivocally provides the special definition for the term or phrase.

Embodiments provide a method and apparatus for reconstruction of noisy signals in the sparse domain. If some prior information about the signal statistics is available, this information is combined with a signal-sparsity assumption in the reconstruction process. More specifically, the embodiments include a low complexity reconstruction process, which is robust against relatively large amounts of noise, and, if available, exploits at least a portion of the prior information on the second order statistics of the signal. In one example, the second order statistics may be characterized by a covariance function. The reconstruction process may be implemented in a number of different applications such as multipath wireless channels, images, holograms, video, radar, hyperspectral imaging, geophysical data analysis, remote sensing, surface characterization and metrology, bio signals, electrocardiograms, electroencephalograms, or magnetic resonance imaging, for example.

Second order statistics about the random process governing the signal can be incorporated in the reconstruction process by including statistical information which partially captures the prior knowledge about the distribution of the non-zero components. However, in most practical scenarios only a partial description of the statistics is available and the amount of mismatch between the real distribution and the postulated distribution is not known in general. Therefore, the reconstruction process of the embodiments provide a recovery process that adaptively utilizes the available prior knowledge and exploits accurate prior knowledge of the signal, when the prior knowledge is available but without penalizing the performance when the available prior is limited or the postulated distribution is mismatched with respect the real distribution.

First, this disclosure will discuss a system using the reconstruction process of the embodiments. Second, this disclosure will discuss the details of the reconstruction process. Third, this disclosure will discuss the reconstruction process application to wireless channel estimation.

1. General System

FIG. 1 illustrates a system 100 for reconstruction of noisy signals in the sparse domain according to an embodiment. The system 100 includes an analog source 105, an encoding block 110 and a recovery block 125. Further, the system 100 may include other components that are well known in the art to acquire, compress, transmit/store, and reconstruct signals. The encoding block 110 acquires an analog signal from the analog source 105 and encodes the analog signal to obtain a set of noiseless measurements that represents the analog signal.

The encoding block 110 includes an acquisition unit 115 and a compression unit 120. In the case of wireless channel estimation, the encoding block 110 may be implemented at a base station in a wireless communication system or any other type of device that performs functions similar to the base station. Also, the encoding block 110 may be implemented in personal computer systems, mobile video phones, smart phones or any type of computing device that may acquire signals. Generally, the encoding block 110 may be implemented in any type of device that acquires and compresses signals. Further, the functions of the encoding block 110 may be controlled/operated using one or more processors.

The acquisition unit 115 may be any type of device capable of acquiring analog data. In one embodiment, the acquisition unit 115 may acquire the analog signal in the natural domain or time domain, and be implemented in a CCD sensor and/or CMOS sensor, for example. In another embodiment (e.g., in the case of multipath channel estimation), the acquisition unit 115 acquires the analog signal in the Fourier domain instead of the time domain. The compression unit 120 may be any type of device capable of compressing the acquired signal using compressive sensing (CS). In one embodiment, the compression unit 120 may be a jpeg compressor that operates in the sparse domain. Also, the acquisition unit 115 and the compression 120 may be implemented in one device or unit, where the acquisition and compression processes are performed jointly using the compressive sensing (CS). For example, the encoding block 110 may encode the signal by applying a measurement basis to the signal in order to obtain a set of measurements in the compressed domain. For instance, an image or video camera captures a significant amount of data when acquiring image or video data. In order to store or transmit the acquired signal, the signal is acquired and compressed by exploiting a priori knowledge such as the fact that an N-pixel image can be approximated as a sparse linear combination of wavelets coefficients, which are less than the N pixels. In other words, the N-pixels may be relatively large. However, the encoding block 110 obtains a set of measurements, which are less than the number of pixels, by applying a measurement basis to the signal.

The system 100 may include other components that perform post-processing on the set of noiseless measurements. For example, in the case of wireless channel estimation, the system 100 may include a channel encoder that packages the set of noiseless measurements into datagrams. Depending on the application of the system 100, the post-processing on the set of measurements before the measurements are stored and/or transmitted may be implemented according to someone with ordinary skill in the art.

The set of measurements may then be stored or transmitted. For example, the system 100 may store the set of measurements in a storage unit such as any type of memory storage. Further, the system 100 may transmit the set of measurements via a network. The network may be any known transmission, wireless or wired, network. For example, the network may be a wireless network which includes a radio network controller (RNC), a base station (BS), or any other known component necessary for the transmission of data over the network from one device to another device.

The recovery block 125 receives a noisy version of the signal containing the transmitted or stored set of measurements and reconstructs the signal in the sparse domain. The recovery block 125 may be any type of device capable of reconstructing signals from a set of measurements. For example, the recovery block 125 may be implemented at a base station or a network element that performs similar functions, in the case of wireless channel estimation. Also, the recovery block 125 may be implemented in personal computer systems, mobile video phones, smart phones or any type of computing device that may received signal containing data. Further, the functions of the recovery block 110 may be controlled/operated using one or more processors. The signal containing the transmitted or stored set of measurements also contain noise, which was introduced through the transmission/storage. The recovery block 125 includes a receiving unit 130 (e.g., a front end receiver) and a reconstruction unit 135. In the case of wireless channel estimation, the receiving unit 130 may include one or more antennas. However, the receiving unit 130 may be any type of receiving device. After the receiving unit 130 receives the set of noisy measurement, the reconstruction unit 135 reconstructs the signal in the sparse domain, as further explained with reference to FIG. 2 of the present application.

2. Reconstruction Process

Figure 2:
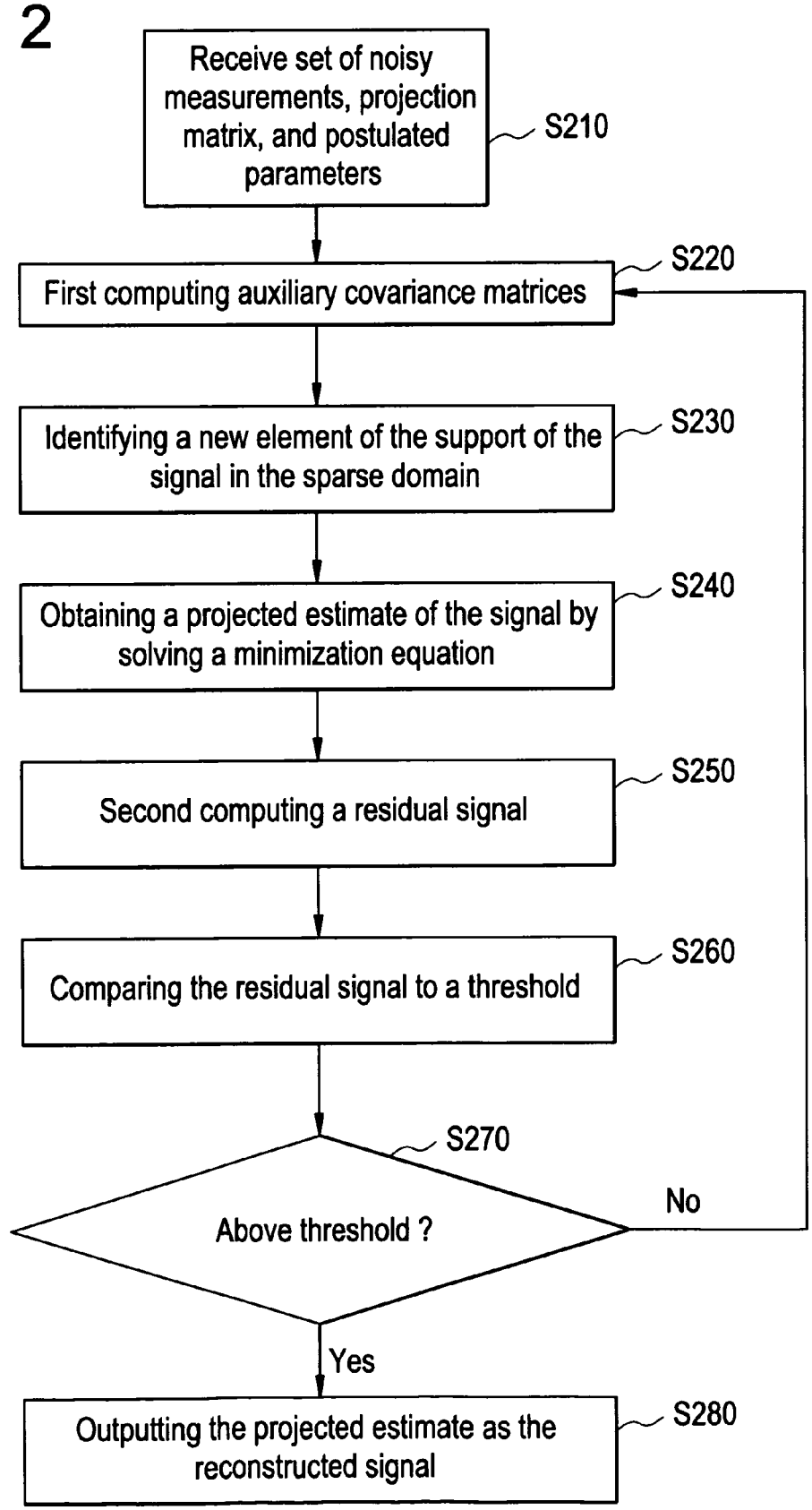
FIG. 2 illustrates a flow chart for reconstruction of noisy signals in the sparse domain according to an embodiment.

FIG. 2 illustrates a flow chart for reconstruction of noisy signals in the sparse domain according to an embodiment.

In step S210, the reconstruction unit 135 receives the set of noisy measurements y from the receiving unit 130 and obtains a plurality of parameters. The set of noisy measurement y is a vector including a plurality of values representing the original signal in a compressed domain. The plurality of parameters includes a projection matrix $\Phi \in C^{n \times n}$ that transforms the signal from a sparse domain to a compressed domain and a number of postulated parameters. A sparsifying base is a suitable base of the signal domain along which the signal can be represented with a reduced number of projections (e.g., components). The sparse domain is the domain of a signal described by the sparsifying base. The compressed domain is a domain of the signal which is incoherent with respect to the sparse domain; this means that any base vector of the compressed domain is incoherent with the any vector of the sparsifying base. For example, time domain and Fourier domain are incoherent domains. The projection matrix $\Phi \in C^{n \times n}$ is an n×n matrix having values that are pre-defined, where C is complex field. The projection matrix $\Phi \in C^{n \times n}$ is a parameter that is known to the encoding block 110 and the recovery block 125.

The postulated parameters may include a postulated signal-to-noise ratio SNR, a postulated spasity $\hat{q}$ and a postulated covariance matrix $\Sigma_{vv} \in C^{nL \times nL}$ of the signal in the sparse domain. However, it the postulated covariance matrix is available in the natural domain instead, the postulated covariance matrix may be converted into the sparse domain through methods that are well known to one of ordinary skill in the art. The postulated parameters are parameters that may not reflect the accurate conditions of the underlying process of the signal. For example, the postulated signal-to-noise SNR ratio may not reflect an accurate signal-to-noise ratio of the signal, but rather the postulated signal-to-noise ratio SNR may be an estimate of such ratio or a default value, for example. The postulated signal-to-noise ratio SNR and the postulated spasity $\hat{q}$ may be obtained by the reconstruction unit 135 via methods that are well known to one of ordinary skill art. For example, the postulated signal-to-noise ratio SNR may be received and well approximated from a user equipment that periodically computes and transmits this type of information. Further, the postulated spasity $\hat{q}$ of the signal may be obtained from an analysis of the signal, or is known beforehand depending on the application. For example, in the case of wireless transmission, the postulated spasity $\hat{q}$ may be well approximated. However, the system 100 may not have enough information to well approximate the covariance matrix $\Sigma_{vv} \in C^{nL \times nL}$. As such, the embodiments provide a default value or a postulated covariance matrix $\Sigma_{vv} \in C^{nL \times nL}$, this postulated covariance matrix $\Sigma_{vv} \in C^{nL \times nL}$ is further refined during the reconstruction process. The postulated covariance matrix $\Sigma_{vv} \in C^{nL \times nL}$ is a matrix with a dimension nL×nL. The value of postulated covariance matrix $\Sigma_{vv} \in C^{nL \times nL}$ may be determined from a sample covariance matrix, which is computed from several available realizations of the signal. Also, the postulated covariance matrix may be determined from available partial information on the second order statistics of the signal. Based on such partial information, a covariance matrix is postulated (assumed) taking into account the specific nature of the signal that would be reconstructed. Also, if there is no prior knowledge about the signal, the variance matrix may be constructed as an identity matrix.

After the above parameters are received, the reconstruction unit 135 initializes starting parameters according to the following equation:

$$r_0 = y \in C^{nL}, \Lambda_0 = \emptyset, Q_0 = I_n, B^{(0)} = 0_n, \lambda_0 = \emptyset, \text{ and } t=0. \quad \text{Eq. (1):}$$

Matrix $I_n$ is an identity matrix, and represents a square matrix of size n with all zero entries except in the diagonal where the entries are equal to 1. L denotes the number of observations of the signal that are going to be jointly estimated, n is the length of the signal, $0_n$ is a square matrix of with all entries equal to 0 and $\emptyset$ is the empty set. Before proceeding to step S220, the reconstruction unit 135 increases the time t by an integer such as 1 (e.g., t=t+1).

In step S220, the reconstruction unit 135 computes auxiliary covariance matrices $\Sigma_{xx}$ based on the set of noisy measurements y, the postulated covariance matrix and $\Sigma_{vv} \in C^{nL \times nL}$, and the postulated signal-to-noise SNR ratio $\Sigma_{vv} \in C^{nL \times nL}$ using the following equation:

$$\Sigma_{xx} = \frac{tr[\Sigma_{vv}]}{\hat{q}n} I_{nL} \qquad \text{Eq. (2):}$$

The operator $tr[A_n]$ denotes the sum of the diagonal elements of $A_n$, $\hat{q}$ is the postulated number of nonzero elements of the signal when represented in the sparse domain (e.g., the postulated spasity), n is the length of the signal and $I_{nL}$ is an identity matrix of size nL×nL, as described above.

In step S230, the reconstruction unit 135 identifies a new element $\lambda_t$ of the support of the signal in the sparse domain based at least on the projection matrix $\Phi \in C^{n \times n}$, the set of noisy measurements y, and the postulated covariance matrix $\Sigma_{vv} \in C^{nL \times nL}$ of the signal using the following equation:

$$\lambda_t = \underset{i \in \Lambda_t}{\operatorname{argmax}} r_{t-1}^\dagger \left( \sigma I_{nL} + \Phi Q_{t-1} \Sigma_{vv} Q_{t-1}^\dagger \Phi^\dagger + \sigma_v^{(i)} \frac{1-q}{q} \phi_i \phi_i^\dagger \right)^- r_{t-1}, \qquad \text{Eq. (3):}$$

where $Q^{(t)} = (I_L \otimes Q^{(t)})$, $\Phi^{(t)} = (I_L \otimes \Phi^{(t)})$, $\phi_i = (1_L \otimes \phi_i) \in C^{nL}$ with $\phi_i$ being the i-th column of $\Phi$ with $i \in \Lambda_t$ and finally $\sigma_v^{(i)}$ denotes the i-th diagonal element of $\Sigma_{vv}$.

The parameter $\sigma^2$ is the noise standard deviation derived from the postulated SNR. The rest of the variables in Eq. (3) have already been defined above. Generally, the above function compares the quadratic form in the expression of Eq. (3) for all possible columns of the projection matrix and chooses the index of the one giving the largest value as the new element of the support.

Also, the reconstruction unit 135 redefines the sparsity matrix using the following equation:

$$B^{(t)} = B^{(t-1)} \qquad \text{Eq. (4):}$$

The sparsity matrix $B^{(t)}$ is a n×n matrix with all zeros as entries except in the rows and columns given by the support estimate at iteration t.

In addition, the reconstruction unit 135 augments an index set $\Lambda_t = \Lambda_{t-1} \cup \{\lambda_t\}$ and the non-zero elements of the sparsity matrix $(B^{(t)})_{\lambda_t,\lambda_t} = 1$. $\Lambda_t$ is the estimate of the support at iteration t. That is, the indices of the nonzero components of the signal estimate in the sparse domain at iteration t.

In step S250, the reconstruction unit 135 obtains an estimate $v_t$ of the signal by solving the following optimization problem (e.g., a minimum mean square error problem) using the identified new element $\lambda_t$, the projection matrix $\Phi \in C^{n \times n}$ and the computed auxiliary covariance matrices $\Sigma_{xx}$:

$$v_t = B^{(t)} \Sigma_{xx} B^{(t)} \Phi^\dagger (\Phi B^{(t)} \Sigma_{xx} B^{(t)} \Phi^\dagger + \sigma I_{nL})^- y, \text{ where } B^{(t)} = (I_L \otimes B^{(t)}). \qquad \text{Eq. (5):}$$

The estimate $v_t$ is the signal estimate in the sparse domain during iteration t. This equation describes a linear minimum mean squared error estimator which uses the postulated statistics and the estimated support at iteration t.

In step S260, the reconstruction unit 135 computes a residual signal $r_{t+1}$ based on the estimated signal $v_t$ projected in the compressed domain and the set of noisy measurements y using the following equation:

$$r_{t+1} = y - \Phi v_t \qquad \text{Eq. (6):}$$

For example, the reconstruction unit 135 evaluates the difference between the received noisy version of the signal (e.g., the observation) and the estimated signal projected in the compressed domain. If the estimation of the signal is accurate or relatively accurate, then such difference will contain the noise-contribution.

Also, the reconstruction unit 135 computes the iteration dependent matrix $Q_{t+1} = Q_t$ with $(Q_t)_{\lambda_t,\lambda_t} = 0$. In this step, the reconstruction unit 135 updates the matrix $Q_t$, whose role is to subtract the effect of the new estimated element of the support from the covariance matrix of the signal in order to evaluate the covariance matrix of the residual.

In step S260, the reconstruction unit 135 compares the residual signal $r_{t+1}$ to a threshold using the following equation:

$$Pr_{t+1} P_2 > \epsilon \qquad \text{Eq. (7):}$$

Epsilon is a parameter that can be tuned depending on the application of the reconstruction process. In one embodiment, the epsilon may be chosen as $\epsilon = \sigma^2$.

In step S270, the reconstruction unit 135 determines whether the residual signal is above the threshold. For example, if the residual signal is above the threshold, the reconstruction unit 135 proceeds back to step S220. If the residual signal is equal to or below the threshold, in step S280, the reconstruction unit 135 outputs the estimate as the reconstructed signal.

The reconstruction process of the embodiments may be characterized as a greedy iterative algorithm, which exploits the diversity of the signal. The reconstruction process is robust against noise because the presence of the noise effect is incorporated in the greedy step using a postulated signal-to-noise ratio. Further, the reconstruction process exploits the second order statistics and the support distribution.

3. Application to Wireless Channel Estimation

In this section, the concepts described above are applied to a practical scenario, namely channel estimation for wireless channels, which a fundamental task for any wireless system due to the desirability of coherent reception. The acquisition process performance is dependent on the propagation characteristics of the specific environment in which the system is operating and therefore, due to the time varying nature of most practical wireless channels, a great deal of adaptive techniques and fine tuning are required to achieve close to optimal performances.

For channels with low variability of their path arrivals, estimation can be carried under the assumption that the observed channel is Gaussian. Reducing the problem to estimating a multivariate Gaussian observation has the advantage of low complexity since it can be solved with a linear minimum mean squared error estimator (LMMSE) with relatively good performance as long as the delay profile does not have a large variance. However, there is still another assumption that needs to be done to ensure close to optimum performance, namely that the channel does not change in time. Unfortunately, this is not entirely true for any real scenario involving a wireless communication system, and thus forces MMSE based acquisition schemes to estimate second order channel statistics.

A more demanding case arises when the Gaussianity assumption is dropped. It is well known that MMSE estimation can still be performed via a conditional mean expectation based in a full characterization of the random process describing the channel. However, this is both computationally complex and unfeasible due to the impossibility of accurate description of higher order moments of the underlying random process. A LMMSE approach can still be implemented, but the performance degrades fast when the divergence between the true distribution and the Gaussian increases, i.e., when the delays of the paths have more variability. Even if the divergence is bounded within acceptable ranges, the covariance matrix estimation problem still exits which adds more distortion to the already imperfect estimation.

Since wireless channels tend to exhibit a sparse multipath structure $l_1$-minimization techniques, can provide better performance than current recovery algorithms which do not exploit the underlying sparsity. Due to the nature of wireless channels, sparsity levels can be expected to be almost stationary and not significantly affected by the statistical changes of the underlying random process.

3.1 From the Multipath Wireless Channel Model to the Sparse Signal

In the following, a discussion of a wireless channel being sparse is explained, which is then linked to a signal model. Next, the signal model of a general wireless system that rely on training-based methods for channel estimation is introduced.

Let us consider a multiple antenna channel with half-wavelength spaced linear arrays at the transmitter and the receiver. Let $N_T$ and $N_R$ denote the number of transmit and receive antennas, respectively. The corresponding (complex) baseband transmitted signal and channel output are related as follows:

$$y(t) = \int_R H(t,f) X_d(f) e^{j2\pi ft} df dt, \quad \text{Eq. (7)}$$

where $y(t)$ is the $N_R$-dimensional channel output, $X_d(f)$ is the $N_T$ dimensional transmitted signal in the frequency domain, and $H(t,f)$ is the $N_R$ $N_T$ time-varying frequency response matrix of the channel. The matrix $H(t,f)$ can be further expressed in terms of the underlying physical paths as follows:

$$H(t, f) = \sum_{p=1}^{N_p} a_R(\theta_{R,q}) a_T^\dagger(\theta_{T,p}) e^{-j2\pi\tau_p f} e^{-j2\pi\nu_p t}, \quad \text{Eq. (8)}$$

which represents signal propagation over $N_p$ paths; here, $\beta_p$ is the complex path gain, $\theta_{R,p}$ is the angle of arrival (AoA) at the receiver, $\theta_{T,i}$ is the angle of departure (AoD) at the transmitter, $\tau_{T,i}$ is the (relative) delay, and $\nu_p$ is the Doppler shift associated with the p-th path. We assume that the channel is maximally spread in the angle space, $(\theta_{R,p}, \theta_{R,p}) \in [-1/2, 1/2] \times [-1/2, 1/2]$, while $\tau_p \in [0, \tau_{max}]$ and $\nu_p \in [-\nu_{max}/2, \nu_{max}/2]$ in the delay and Doppler space, respectively. The normalized angle is related to the physical angle (measured with respect to array broadside) as $\theta = d \sin(\phi)/\lambda$, where d is the antenna spacing and $\lambda$ is the wavelength of propagation.

Let denote the dimension of the temporal signal space by n=TW, where T is the symbol duration and W the (two-sided) bandwidth of the signals. In order to get a discretized approximation of the time-varying frequency response of a multipath channel, we can use the so-called virtual representation obtained by uniformly sampling the angle-delay-Doppler space at the Nyquist rate: $(\Delta\theta_R, \Delta\theta_T, \Delta\tau, \Delta\nu) = (1/N_R, 1/N_T, 1/W, 1/T)$. Hence, the virtual representation of $H(t,f)$ is given by:

$$H(t, f) = \sum_{i=1}^{N_R} \sum_{k=1}^{N_T} \sum_{l=1}^{L-1} \sum_{g=-G}^{G} H_v(i, k, l, g) a_R\left(\frac{i}{N_R}\right) a_T^\dagger\left(\frac{k}{N_T}\right) e^{-j2\pi \frac{l}{W} f} e^{j2\pi \frac{g}{T} t}, \quad \text{Eq. (9)}$$

where each coefficient $H_v(i,k,l,g)$ is approximately equal to the sum of the complex gains of all physical paths whose angles, delays, and Doppler shifts lie within an angle delay-Doppler resolution bin of size $\Delta\theta_R \times \Delta\theta_T \times \Delta\tau \times \Delta\nu$ centered around the sampling point $(\hat{\theta}_{R,i}, \hat{\theta}_{T,k}, \hat{\tau}_l, \hat{\nu}_g) = (i/N_R, k/N_T, l/W, g/T)$ in the angle-delay-Doppler space.

From the virtual representation of a multipath wireless channel, the maximum number of degrees of freedom (DoF) in the channel is:

$$D = N_R N_T L (2G+1) \approx \tau_{max} \nu_{max} N_R N_T TW, \quad \text{Eq. (10)}$$

where $N_R$, $N_T$, $L = \lceil W\tau_{max} \rceil + 1 \leq n$, and $G = \lceil T\nu_{max}/2 \rceil$ represent the maximum number of resolvable angle of arrivals, angle of departures, delays, and (one-sided) Doppler shifts within the angle-delay-Doppler spread of the channel, respectively. However, the actual or effective number of DoF, d, in the channel that governs its capacity and diversity corresponds to the number of dominant virtual channel coefficients: $d = |\{|H(i,k,l,g)| > \epsilon\}|$. An intuitive choice for $\epsilon$ is the standard deviation of the receiver noise.

Channel measurements, however, have shown that propagation paths in many physical channels tend to be distributed as clusters within their respective channel spreads. This implies that as we vary the spatio-temporal signaling parameters in such channels by increasing the number of antennas, signaling bandwidth, and/or symbol duration, the number of dominant components d is far fewer than D, and, as already underline before, our goal is try to estimate such dominant components. It is worth to recall here that estimating a channel having $\tau_{max} \nu_{max} > 1$ can often be an ill-posed problem even in the absence of noise. Hence, the discussion is limited to underspread channels, characterized by $\tau_{max} \nu_{max} \leq 1$, which is fortunately true of many wireless channels.

In order to estimate $H(t,f)$, training-based methods focus only on the received training signal component of the received signal, from which the estimation has to be performed, given by:

$$y_{tr}(t) = \int_R H(t,f) X_{tr}(f) e^{j2\pi ft} df + z(t), \quad \text{Eq. (10)}$$

where $X_{tr}(f)$ is the (elementwise) Fourier transform of the $N_T$-dimensional transmitted training signal, z is a $N_R$-dimensional complex additive white gaussian noise. Based on all the above consideration and operating over the output of the front end receiver, after some linear transformation (e.g., matched filtering with the transmitted waveforms) and elementary algebraic manipulation, the equivalent discrete signal of Eq. (10) can be rewritten in the following linear general form:

$$\underbrace{[y_1 \ldots y_{N_R}]}_{Y} = \Phi \underbrace{[h_1 \ldots h_{N_R}]}_{H_v} + Z, \quad \text{Eq. (11)}$$

where the vectors $\{h_l\}_{l=1}^{N_R}$, are $N_T L(2G+1)$-dimensional complex vectors comprising of the virtual channel coefficients $H_v(i,k,l,g)$, denotes the discrete-time representation of the impulse response of the channel, each column of $Y \in C^{D \times N_R}$ is the received training sequence in the respective antenna, $H_v \in C^{D \times N_R}$ contains the virtual channel coefficients arising from the observation of an antenna in each row, $Z \in C^{D \times N_R}$ is the noise matrix with entries z: $CN(0,\sigma^2)$, and finally $\Phi \in C^{D \times L}$ is the generally complex valued channel sensing matrix whose exact form will depend by the adopted training sequences, If, as illustrated in the next section, OFDM signaling are used for communication, and the channel, we are sensing and estimating, is a frequency-selective channel (i.e. G=0), and $\tau_{max}=T$ or equivalently L=n, then the training signal transmitted from the $l_T=1, \ldots, N_T$ transmitting antenna, takes the form:

$$x_{tr,l_T}(t) = \sum_{i \in S_{tr,l_T}} g(t)e^{2\pi \frac{i}{T}t} 0 \leq t \leq T, \quad \text{Eq. (12):}$$

where g(t) is simply a prototype pulse having unit energy, $S_{tr,l_T} \subset \{0, 1, \ldots, n\}$ is the set of indices of pilot tones used for training, and $m_{tr,l_T}$ which represents the number of receive training dimensions, denotes the total number of pilot tones in this case, $m_{tr,l_T}=|S_{tr,l_T}|$, and $S_{tr,l_T}$ identifies the sampling pattern of the channel response that we are sensing. The received training signal, at the $l_R=1, \ldots, N_R$ receiving antenna, is given by:

$$y_{l_R}(t) = \sum_{l_T=1}^{N_T} \sum_{i=1}^{n} H_v(i) x_{tr,l_T}(t - l/W) + z_{l_R}(t) \quad \text{Eq. (13):}$$

Finally, matched filtering with the OFDM basis waveforms $$\left\{ g(t)e^{2\pi \frac{i}{T}t} \right\}_{i \in S_{tr,l_T}}$$

with $l_T=1, \ldots, N_T$, yields to the equivalent linear form:

$$y_{l_R} = \sum_{l_T=1}^{N_T} \Phi_{l_T} h_{l_R} + z_{l_R}, \quad \text{Eq. (14):}$$

where the sensing matrix $\Phi_{l_T}$ can be written as the following matrix product:

$$\Phi_{l_T} = A_{l_T} F \quad \text{Eq. (15):}$$

with $A_{l_T}$ being a n×n diagonal matrix having $m_{l_T}$ non-zero diagonal elements defined as follows:

$$(A_{l_T})_{i,i} = \begin{cases} 1, & \text{for } i \in S_{tr,l_T} \\ 0, & \text{otherwise,} \end{cases} \quad \text{Eq. (16)}$$

and F denoting the n×n unitary matrix whose columns form the n-dimensional unitary discrete-time Fourier basis. The elements of F are given by:

$$F_{i,k} = \frac{1}{\sqrt{n}} e^{-\frac{j2\pi}{N}(i-1)(k-1)}. \quad \text{Eq. (17)}$$

Therefore, the reconstruction process for the channel estimation in a wireless system may be based on the same question discussed with reference to Section 2.

Recovery techniques of the embodiments, which exploit the sparsity of the channel, perform significantly better than conventional estimation techniques.

Variations of the example embodiments are not to be regarded as a departure from the spirit and scope of the example embodiments, and all such variations as would be apparent to one skilled in the art are intended to be included within the scope of this disclosure.

What is claimed:

1. A method for reconstructing a signal from a set of noisy measurements, the method comprising:
   receiving, by a receiving unit, the set of noisy measurements;
   identifying, by a reconstruction unit, a new element of support of the signal in a sparse domain based on a projection matrix, the set of noisy measurements and at least one postulated parameter, the projection matrix transforming the signal from a sparse domain to a compressed domain; and
   obtaining, by the reconstruction unit, an estimate of the signal based on at least the set of noisy measurements, the identified new element of support, the at least one postulated parameter and the projection matrix.

2. The method of claim 1, wherein the at least one postulated parameter includes at least one of a postulated signal-to-noise ratio, postulated spasity and a postulated covariance matrix of the signal in the sparse domain.

3. The method of claim 1, further comprising:
   first computing, by the reconstruction unit, auxiliary covariance matrices based on the set of noisy measurements and the at least one postulated parameter;
   wherein the obtaining obtains the estimate of the signal by solving an optimization problem using the identified new element of support, the projection matrix and the computed auxiliary covariance matrices.

4. The method of claim 3, further comprising:
   second computing, by the reconstruction unit, a residual signal based on the estimated signal in the compressed domain and the set of noisy measurements;
   comparing, by the reconstruction unit, the residual signal to a threshold; and
   repeating, by the reconstruction unit, the first computing, the identifying, the obtaining, the second computing, and the comparing, if the residual signal is above the threshold, otherwise the estimate is outputted as the reconstructed signal.

5. The method of claim 4, wherein the second computing includes evaluating a difference between the set of noisy measurements and the estimated signal in the compressed domain.

6. The method of claim 4, wherein the at least one postulated parameter includes at least one of a postulated signal-to-noise ratio, postulated spasity and a postulated covariance matrix of the signal in the sparse domain.

7. The method of claim 6, wherein the first computing computes the auxiliary covariance matrices based on the set of noisy measurements, the postulated covariance matrix of the signal and the postulated signal-to-noise ratio.

8. The method of claim 6, wherein the identifying identifies the new element of the support of the signal based on the projection matrix, the set of noisy measurements, and the postulated covariance matrix of the signal.

9. The method of claim 1, wherein the signal has been encoded or acquired based on compressive sensing.

10. The method of claim 1, wherein the estimate of the signal is an estimate of a channel response in a wireless communication network.

11. An apparatus for reconstructing a signal from a set of noisy measurements, the apparatus comprising:
   a receiving unit configured to receive the set of noisy measurements; and
   a reconstruction unit configured to,
      identify a new element of support of the signal in a sparse domain based on a projection matrix, the set of noisy measurements and at least one postulated parameter, the projection matrix transforming the signal from a sparse domain to a compressed domain, and
      obtain an estimate of the signal based on at least the set of noisy measurements, the identified new element of support, the at least one postulated parameter and the projection matrix.

12. The apparatus of claim 11, wherein the at least one postulated parameter includes a postulated signal-to-noise ratio, postulated spasity and a postulated covariance matrix of the signal in the sparse domain.

13. The apparatus of claim 11, wherein
   the reconstruction unit is further configured to first compute auxiliary covariance matrices based on the set of noisy measurements and the at least one postulated parameter, and
   the reconstruction unit is further configured to obtain the estimate of the signal by solving an optimization problem using the identified new element, the projection matrix and the computed auxiliary covariance matrices.

14. The apparatus of claim 13, wherein
   the reconstruction unit is configured to second compute a residual signal based on the estimated signal in the compressed domain and the set of noisy measurements,
   the reconstruction unit is configured to compare the residual signal to a threshold, and
   the reconstruction unit is configured to repeat the first computing, the identifying, the obtaining, the second computing, and the comparing, if the residual signal is above the threshold, otherwise the reconstruction unit outputs the estimate as the reconstructed signal.

15. The apparatus of claim 14, wherein the reconstruction unit is configured to compute the residual signal by evaluating a difference between the set of noisy measurements and the estimated signal in the compressed domain.

16. The apparatus of claim 14, wherein the at least one postulated parameter includes a postulated signal-to-noise ratio, postulated spasity and a postulated covariance matrix of the signal in the sparse domain.

17. The apparatus of claim 16, wherein the reconstruction unit computes the auxiliary covariance matrices based on the set of noisy measurements, the postulated covariance matrix of the signal and the postulated signal-to-noise ratio.

18. The apparatus of claim 16, wherein the reconstruction unit identifies the new element of the support of the signal based on the projection matrix, the set of noisy measurements, and the postulated covariance matrix of the signal.

19. The apparatus of claim 11, wherein the signal has been encoded or acquired based on compressive sensing.

20. The apparatus of claim 11, wherein the estimate of the signal is an estimate of a channel response in a wireless communication network.

* * * * *